United States Patent

[11] 3,574,966

[72] Inventor Evan G. Sullivan
     P.O. Box 23, Cookville, Tex. 75558
[21] Appl. No. 826,890
[22] Filed May 22, 1969
[45] Patented Apr. 13, 1971

[54] FISHING APPARATUS AND POWER PLANT
     15 Claims, 8 Drawing Figs.
[52] U.S. Cl. .................................................. 43/8,
     43/13, 43/15, 43/26.1
[51] Int. Cl. ................................................. A01k 73/00,
     A01k 75/00
[50] Field of Search ....................................... 43/1, 4, 6.5,
     8, 13, 15, 42.21, 26.1; 416/85

[56] References Cited
     UNITED STATES PATENTS
     245,251   8/1881  Williams .................. 43/13
     642,935   2/1900  Theall .................... 416/85
   1,123,357   1/1915  Oman ..................... 416/85
   1,562,439  11/1925  Crawford ................. 43/42.21
   1,717,835   6/1929  Calhoun .................. 43/6.5
   2,122,836   7/1938  Gegerfeldt ............... 43/15X Primary Examiner—Warner H. Camp
Attorneys—Munson H. Lane and Munson H. Lane, Jr.

ABSTRACT: A buoyant main body has a sleeve extending therethrough anchored to the water bottom to provide a stationary hub about which the buoyant body may rotate by the use of vanes which engage the water and the air to take advantage of the currents thereof. A power plant is mounted on the body and is driven by gearing from the hub. Outwardly of the buoyant body a large buoyant ring is supported in concentric relation by means of guy wires from a centrally extending derrick and is maintained in proper position by radially extending elements upon which nets, fishhooks and the like for catching fish are mounted so that the rotary movement of the buoyant body and ring cover a large area to attract many fish which are then collected in the usual manner. Means are provided for rendering the current engaging vanes inoperative when the current is opposite the direction of desired movement. The buoyant body may be a boat or a drum and may have the usual power propulsion means.

FIG. I

Patented April 13, 1971

INVENTOR.
EVAN G. SULLIVAN

BY Munson H. Lane

Patented April 13, 1971

INVENTOR.
EVAN G. SULLIVAN
BY *Munson H. Lane*

FISHING APPARATUS AND POWER PLANT

This invention relates to the subject matter of my prior application Ser. No. 650,972, filed Jul. 3, 1967 for Fluid Current Motor, now U.S. Pat. No. 3,442,492, dated May 6, 1969.

Heretofore, various types of fishing equipment have been used but such equipment has required substantial external sources of power and has not taken advantage of the natural flow of currents of water and currents of air and consequently have not been sufficiently economical for small operations.

An object of the present invention is to provide fishing equipment which provides its own power and assures sufficient motion of fishing nets and fishhooks to maintain the fish on the hooks and in the nets.

Another object is to provide a motor which assures taking advantage of all sources of natural power available to fishermen.

Other and further objects will be apparent as the description proceeds and upon reference to the accompanying drawings; wherein.

Briefly the invention includes a stationary hub of tubular form which is anchored to the bottom and a rotary drum is guided thereby and upon rotation drives a power unit such as an air compressor which stores energy, with the drum being driven by wind vanes or water vanes to produce relative rotation, with a buoyant ring concentrically positioned with substantial radial space between the periphery of the ring and the buoyant body so that fishing equipment such as fish nets or fishhooks can be mounted thereon as the buoyant body and ring rotate together, the ring being maintained in proper position by radially extending elements and by guy wires extending from a derrick on the member to the ring. Wind and water engaging vanes may also be mounted on the ring in addition to those on the drum to increase the power obtained and the vanes are arranged to be rendered ineffective by suitable lever means or the like.

Figure 2:
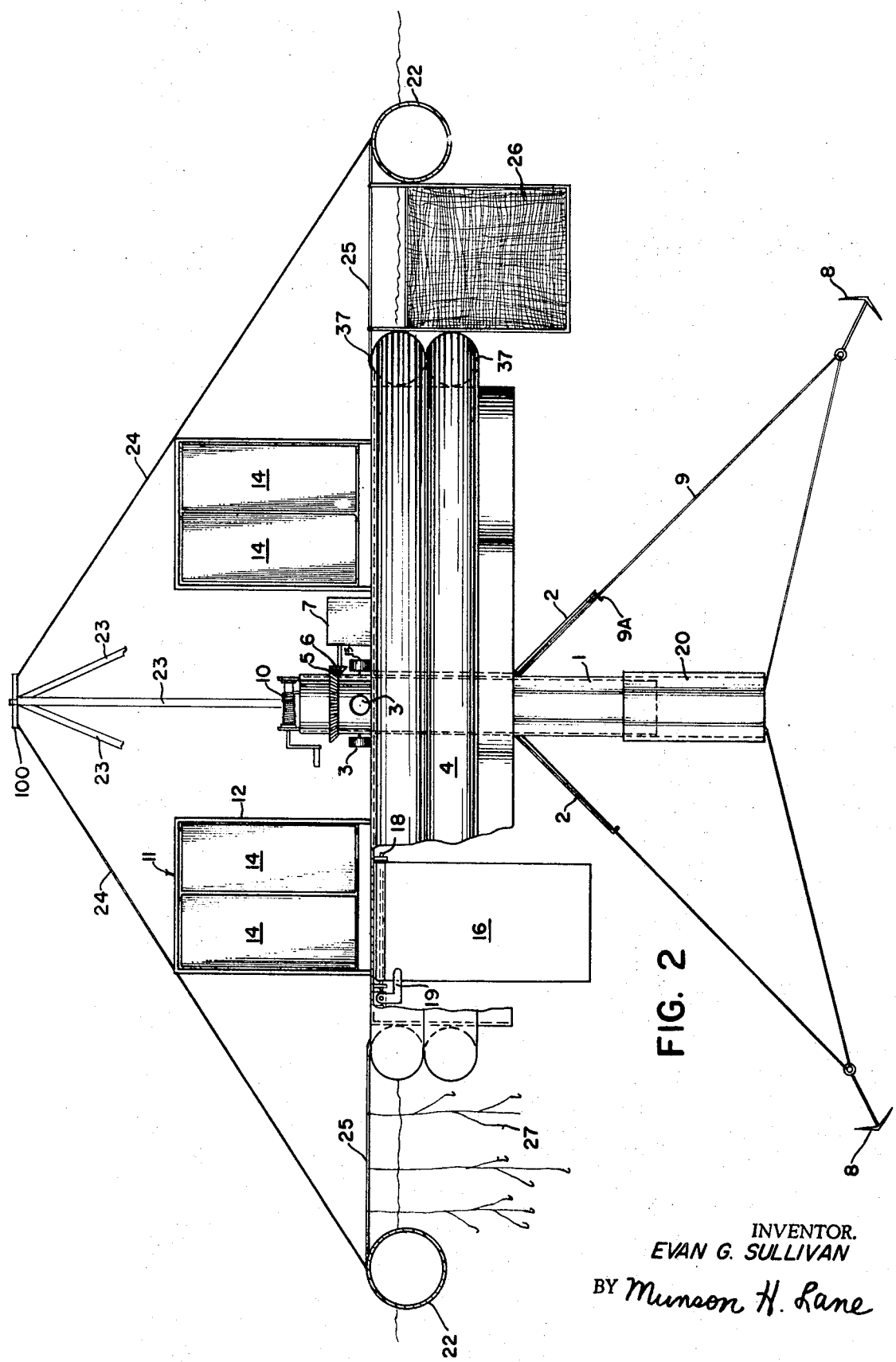
FIG. 2 is a diagrammatic section through the apparatus showing the anchoring means for the central hub and the arrangement of water and wind engaging vanes and the power plant.
Figure 3:
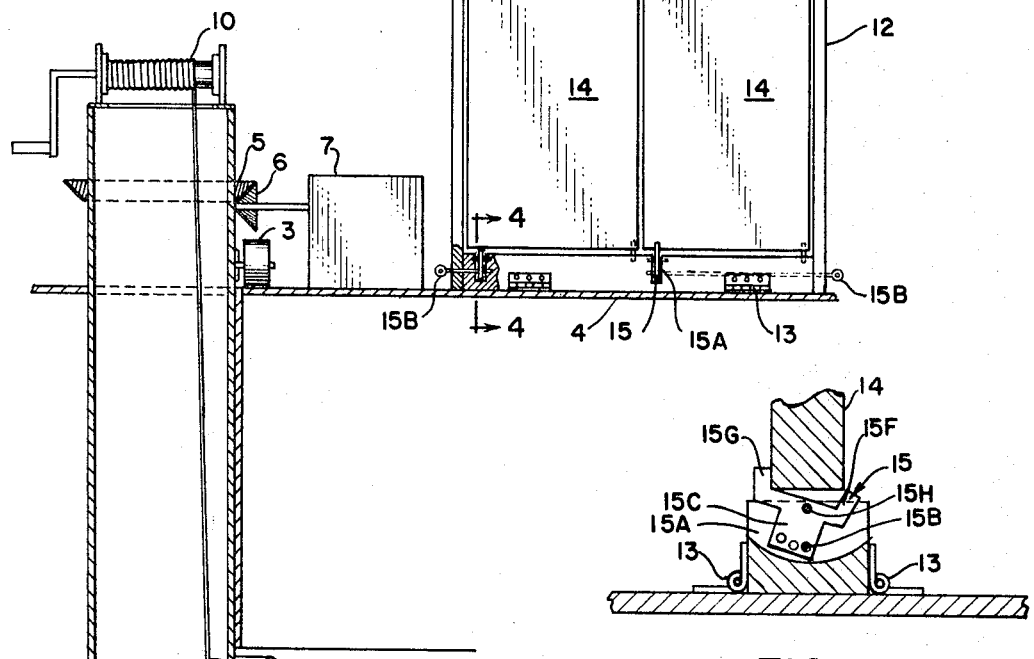
FIG. 3 is an enlarged sectional view taken on broken line 3-3 of FIG. 1 showing the power plant drive and one form of wind vane.

Referring more specifically to FIG. 2 of the drawings, a tubular hub 1 is provided with pivoting anchoring struts 2 adjacent a bottom of the drum and such tubular hub projects above the drum and is supported thereon by rollers 3 riding on a suitable track on the deck of the buoyant drum member 4. The hub 1 carries a ring gear 5 which meshes with a bevel gear 6 driving a power unit 7 such as an air compressor to store energy in a suitable tank. The hub 1 in held stationary and is prevented from rotation by anchors 8 which engage the bottom of the body of water upon which the fishing apparatus is floatingly supported and which may be drawn inwardly by their cables 9 passing through suitable guides in the hub which may have pulleys to reduce friction and passing through guides 9A in the struts 2 with the cables 9 being wound around winch drums 10 operated by manual cranks with the usual ratchet mechanisms to maintain them in proper position. For simplicity only one winch is shown although several are used.

Wind vanes 11 comprising rectangular frames 12 are mounted by means of horizontal hinges 13 (FIG. 4) to the deck and secured in position by suitable means which may be another hinge with removable pin and pivotally mounted therein are vanes 14,14 which are held in position by ratchet type latches suitably mounted in the sill member of the frame so the vanes can be maintained in fixed position or in position to permit the vanes to swing to take advantage of the wind in one direction and to be feathered into the wind in the opposite direction. By removing the hinge pins on one side the frame the vanes can pivot about the hinges on the other side of the frame and be laid flat on the deck and the detents 15 maintain the vanes in the plane of the frame 12. These detents are pivoted in slots 15A in the sills and are held in position by removable pin 15B extending inwardly from the side into openings in segment 15C of the detent 15 to hold the detent 15 in proper position.

Water engaging vanes 16 and 17 are mounted on a square shaft 18 with detent means 19 of suitable type hereinafter described to retain the vane in proper operating position with the detent means being adapted to prevent rotation in one direction when the vane is receiving power and to permit the vane to feather in the opposite direction as hereinafter described.

When this is done the hub 1 is made in telescoping sections with the bottom section 20 telescoping upwardly, as shown in FIG. 2, and being raised by any suitable means such as an additional winch or the like.

A buoyant ring 22 of greatly increased diameter is supported from the drum 4 by means of a derrick having struts 23 extending upwardly from the drum and carrying guy wires 24 suitably attached to the ring 22 and radially extending supporting elements or struts 25 are attached to the drum and to the ring to maintain the proper spacing therebetween and such elements 25 are adapted to support nets 26 which may be of the pocket type so that rotation of the drum causes the fish to be maintained in the bottom of the pocket until removed by the fisherman on the drum. Alternatively or in conjunction therewith, fishhooks 27 may be supported on lines from the struts 25 and the rotation of the drum with the ring will assure that the nets and hooks encompass a wide area.

Figure 5:
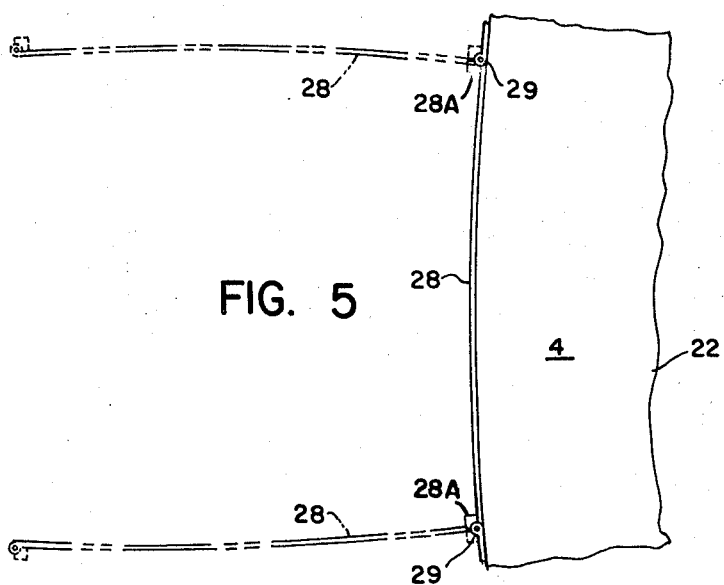
FIG. 5 is a fragmentary plan view of a modified water vane.

Another type of vane which may be used is fragmentarily shown in FIG. 5 where the vane is an arcuate plate 28 fastened by hinges 29 having removable hinge pins so the vane may be pivoted about either hinge to take the force of the water currents as shown in dotted lines therein and therefore is adaptable for operation in either direction upon removal of the pins at the appropriate end. This type of vane can be used on both the drum 4 and the buoyant ring 22.

Figure 6:
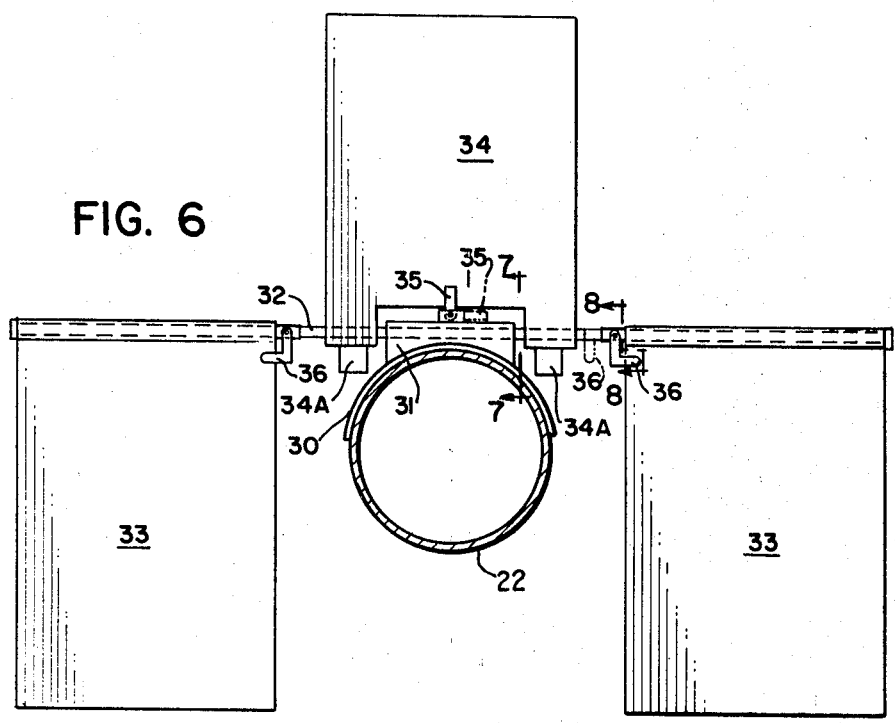
FIG. 6 is an elevation of a combined water and wind vane for the ring.
Figure 7:
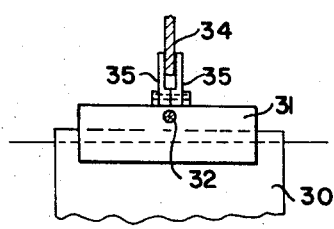
FIG. 7 is a fragmentary section taken on line 7-7 of FIG. 6 showing the detent for the wind vane.
Figure 8:
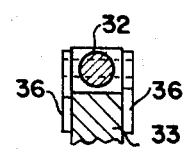
FIG. 8 is a fragmentary section taken on line 8-8 of FIG. 6 showing the detent for holding the auxiliary water vanes in position.

Another form of vane which is a combination wind vane and water vane is shown in FIG. 6 and is adapted to be mounted on the ring 22. The vane includes a saddle 30 of suitable shape with means to attach it to the ring 22 which carries a lug 31 in which a shaft 32 is fixedly mounted and such shaft carries a pair of downwardly extending water vanes 33,33 which may rotate about shaft 32. A wind vane 34 is also freely pivoted on shaft 32 and may have weights 34A,34A to maintain the wind vane 34 in its upright position. To retain the wind vane 34 against movement in one direction pivoted latches 35,35 are rotatably supported in suitable lugs so that the latches 35,35 may embrace the adjacent portion of wind vane 34 and one of the latches may be lowered to its inoperative position as shown in phantom in FIG. 6 so that the wind vane 34 may swing downwardly when it is going against the direction of the wind and will be maintained in upright position by the other detent 35 shown in full lines FIG. 6.

The water vanes 33,33 are retained in position by means of detents 36,36 of L-shape which are pivoted to the shaft 32 on a horizontal transverse axis and are adapted to be in the full line positions to retain the water vane 33 in operative position and the latch 36 on the one side is moved to the inoperative position as shown in phantom lines on the appropriate side so the detent will permit the water vane to swing against the current on the return while when the water vane is moving with the current the appropriate detent engages the water vane and maintains the water vane in its substantially perpendicular position to thereby produce the power.

It will be apparent that the drum is suitably compartmented to be buoyant but to additionally assure the buoyancy thereof buoyant rings 37 may be provided to increase the buoyancy thereof and suitable openings are provided for the passage of the water vanes 16 or 17 to assure continuing operation. It will also be apparent that a suitable number of such vanes and a suitable number of wind engaging vanes are provided to assure that the vanes will operate correctly and suitable detent means are provided in the nature of ratchet means described above to permit the vanes to swing or feather when moving in a direction against the current of water or air.

Figure 1:
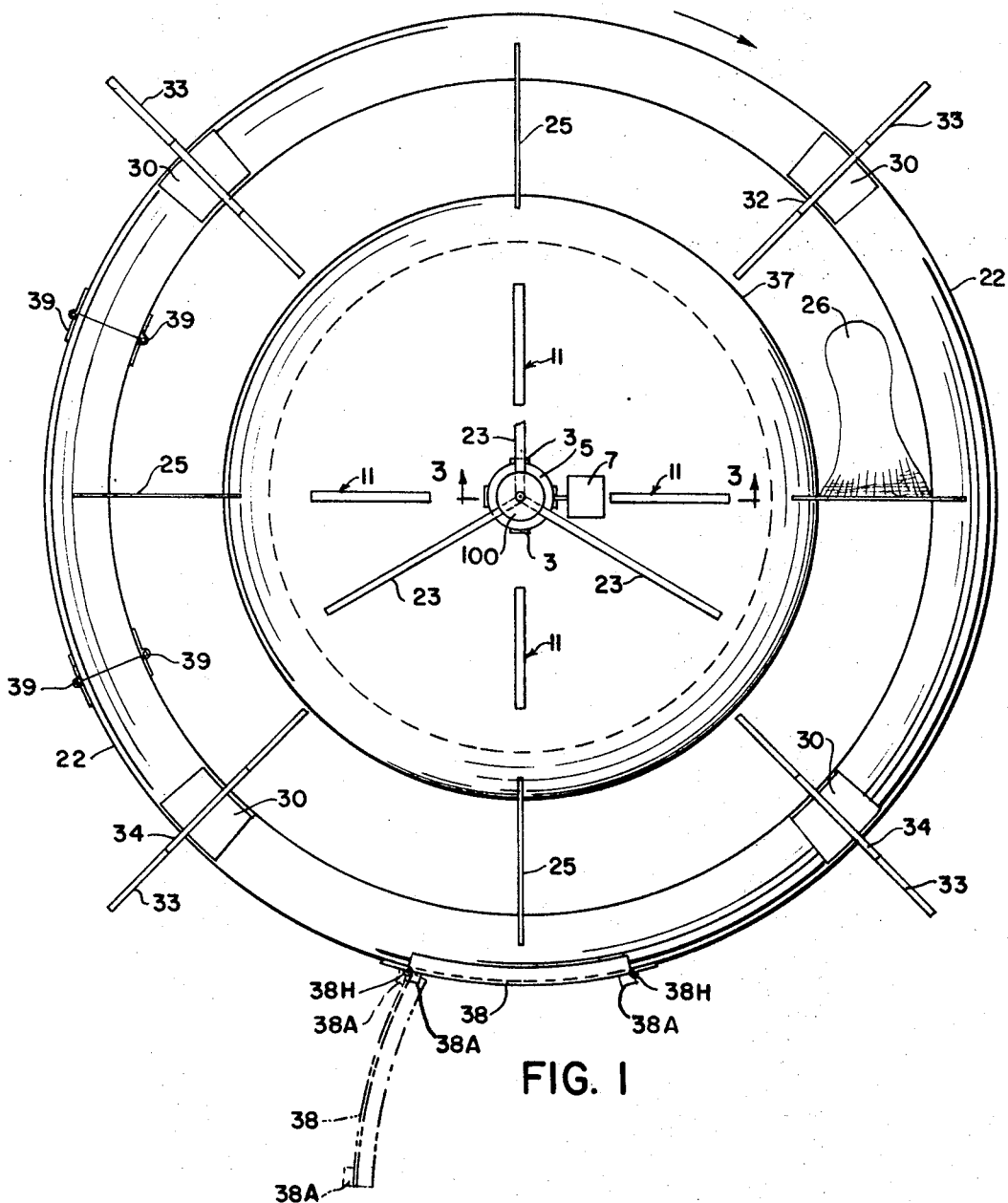
FIG. 1 is a plan diagrammatic view showing the buoyant central body with the buoyant ring concentrically retained by guy wires from a derrick on the buoyant body and net supporting elements extending between the body and the ring with the wind engaging vanes shown thereon.

In FIGS. 1 and 2 various types of vanes are shown in approximately one arrangement with the fish nets and fishhooks 26 and 27 mounted on the fishing apparatus and FIG. 1 also showing a type of pivoted vane 38 on the outer periphery of the ring 22 with the vane 38 being similar to that shown in FIG. 5 but shaped to accommodate circular cross section of the ring 22. It will be noted that the vane 38 is secured by hinges 38H which permit the pivoted movement in the desired direction and stops 38A engage the hinge and prevent rotation beyond substantially the phantom line operative position of the vane 38. It will be evident that a number of such vanes will be used, and it will also be noted that the vane 28 in FIG. 5 is provided with the stops 28A to limit the pivotal movement in the same manner.

Figure 4:
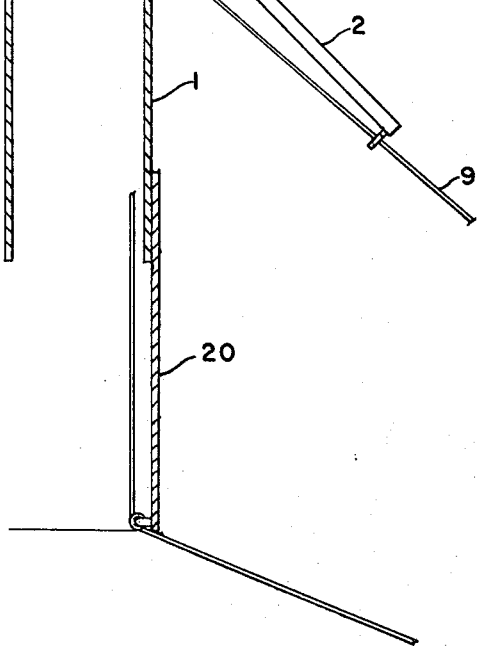
FIG. 4 is a fragmentary section on line 4-4 of FIG. 3 showing the detent latch for the wind vane.

In operation the wind will produce a force of rotation of the wind vanes 14,14 assuming a clockwise rotation as viewed in FIG. 1 and the corresponding detents 15 will be in the opposite position to that shown in FIG. 4 and therefore the wind blowing upwardly will cause the clockwise rotation by the abutment of the detent element 15F, the detent element 15G being positioned downwardly and therefor the wind vane 14 will be maintained in wind force receiving position within the frame 12 and this will continue until the frame gets to the 12 O'clock position at which time the vanes will begin to feather and swing out as the deck rotates and then when the deck rotates sufficiently for the same wind vane to come to the 6 O'clock position the force of the wind will cause the wind vane 14 to again close against the detent element 15F and the force of the wind will then cause the drum to rotate. Similarly the water vane 16 will be moved by the force of the current and will be prevented from movement in one direction by the portion of the detent 19 which is similar to that shown at 36 in FIG. 6 so that the deflected detent element will engage the vane 16 and the force of the current will cause rotation of the drum and the other portion of the detent will be out of the way permitting the feathering action on the return against the current.

It will be apparent that the several types of wind vanes and water vanes produce sufficient force to cause the fishing apparatus and power plant to produce the desired action for moving the fish nets and the fishhooks and producing power in the power unit 7 which may be a compressed air unit for storing energy in the form of compressed air.

Each detent 15 is pivoted on pivot pin 15H and is adapted to have three fixed positions so that the wind vanes may operate the drum in either a clockwise or counterclockwise rotation by the proper positioning of the detent elements 15F or 15G. The detent 15 also has an intermediate position which is obtained by removing the pin 15B from the corresponding opening in the segment 15C and moving the detent so that the detent elements 15G and 15F engage the wind vane 14 preventing pivotal movement of such vane by inserting the pin 15B in the center opening.

The hinges 13 provide sufficient clearance so that in storms the entire wind vane frame 11 can be laid flat on the deck.

To retain the detents 19,19 or 36,36 for the water vanes in inoperative position and in operative position, a resilient latch is provided such as a spring pressed ball. The detents are arranged to take maximum advantage of the wind and water currents.

The buoyant ring 22 is made in sections which are held together by loose pin hinges 39 at each joint so that the knuckles of the hinges interengage and are held in place by the loose pins.

The fishing equipment and particularly the ring 22 is adapted for use on a boat of any suitable type by providing a mast extending upwardly and providing a rotatable member or hub 100 mounted on the top of the struts 23 and attaching the guy lines 24,24 which extend to the ring 22 on the hub 100 by any suitable means. Since the ring 22 will have appreciable rigidity, the stress applied by the guy wires 24 tends to maintain the ring in concentric relation to the boat or to the buoyant body 4. The nets and the fishhooks can then be supported from the guy wires 24 by any suitable means which may be extensions of the fishlines carrying hooks 27 or extensions of the net 26.

When the radial elements 25 maintain the ring 22 and the buoyant body 4 in radially spaced relation, the rotatable hub 100 provides adequate support and does not rotate appreciably.

The boat is propelled in the usual way and the ring when secured only by guy lines 24 to the rotatable hub member 100 will rotate due to the vanes thereon when the boat is propelled in still water so the ring 22 with the nets 26 and hooks 27 can rotate to increase the effectiveness of the equipment. Of course, the ring will rotate relative to the boat or buoyant body 4 when anchored if there is a wind or a water current.

The tubular hub 1 will provide for the passage of drilling or dredging equipment which may be mounted on the buoyant body.

I claim:

1. Floating fishing apparatus comprising a vertical hub, means for anchoring the hub to the bottom of a body of water on which the apparatus is floatingly supported, a buoyant body rotatably mounted on said hub, means to support fishing equipment from the buoyant body and current engaging vanes mounted on the body for causing the body to rotate and thereby move the fishing equipment through the water.

2. The invention according to claim 1 in which the current engaging vanes extend upwardly above the water and are mounted in a frame secured to the body and each vane is pivoted on a horizontal axis and to prevent pivoting action in one direction to obtain the force of the wind and permit pivoting action in the other direction to prevent force from being applied in the other direction.

3. The invention according to claim 2 in which the frame is pivotally mounted on the body so that it may be positioned substantially parallel with the water.

4. The invention according to claim 1 in which the current engaging vanes extend downwardly below the buoyant body.

5. The invention according to claim 1 in which the buoyant body is a circular drum and a power plant mounted on the drum and means actuated by the relative rotary motion between the drum and the hub for supplying power to said plant.

6. The invention according to claim 5 in which a buoyant ring is mounted in substantially concentric relation to the drum and hub and a derrick is mounted on the body with guy lines extending to the ring and retaining elements extend between the ring and the adjacent portions of the drum and the fishing equipment in the form of nets and hooks are mounted on such element.

7. The invention according to claim 6 in which said current engaging vanes comprise vanes for engaging the air and for engaging the water and are mounted on both the drum and the ring.

8. The invention according to claim 7 in which means are provided to render the vanes inoperative.

9. The invention according to claim 1 in which a buoyant ring of substantially greater diameter than the maximum dimension of the buoyant body surrounds the buoyant body and is maintained in accurate position by elements extending from the periphery of the ring to the periphery of the body and the fishing equipment is suspended from such elements.

10. The invention according to claim 9 in which the hub is tubular and extends completely through the buoyant body and strut means are pivoted to the hub below the buoyant body and the means for anchoring the hub includes cables passing through the hub and guided by the struts with the cables secured to anchors spaced outwardly from the hub to prevent rotation thereof.

11. The invention according to claim 10 in which means are provided on the hub to draw the cable inwardly to permit passage in shallow water and the hub includes a telescoping section which raises upwardly by the action of the cables and water engaging vanes requiring less depth are the current engaging vanes.

12. The invention according to claim 9 in which the ring is made in sections which are connected by loose pin hinges one positioned on the inner periphery and the other positioned on the outer periphery.

13. The invention according to claim 9 in which said current engaging vanes comprises wind engaging vanes having means to pivot the vanes and means to prevent pivotal movement in one direction while permitting pivotal movement in a direction to feather the vanes into the current.

14. Fishing apparatus comprising a buoyant body, a mast extending upwardly from the buoyant body, a rotatable member on the mast, a buoyant ring surrounding the buoyant body and guy lines extending from the rotatable member to the buoyant ring and means to support fishing equipment from the guy lines.

15. The invention according to claim 14 in which current engaging vanes are mounted on the buoyant ring and the buoyant body is a boat.